(12) United States Patent
Bhosale et al.

(10) Patent No.: US 9,084,387 B2
(45) Date of Patent: Jul. 21, 2015

(54) WIDE SWING DRAWBAR SUPPORT ASSEMBLY

(71) Applicant: Deere & Company, Moline, IL (US)

(72) Inventors: Digvijay Bhosale, Pune (IN); Edwin R. Kreis, Waterloo, IA (US); Benjamin J. Heimbuch, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 100 days.

(21) Appl. No.: 13/952,744

(22) Filed: Jul. 29, 2013

(65) Prior Publication Data

US 2015/0028563 A1    Jan. 29, 2015

(51) Int. Cl.
| | | |
|---|---|---|
| *B60D 1/44* | (2006.01) | |
| *A01B 59/042* | (2006.01) | |
| *A01B 59/041* | (2006.01) | |
| *B60D 1/00* | (2006.01) | |
| *A01B 59/06* | (2006.01) | |

(52) U.S. Cl.
CPC ............. *A01B 59/042* (2013.01); *A01B 59/041* (2013.01); *B60D 1/44* (2013.01); *A01B 59/062* (2013.01); *B60D 2001/008* (2013.01)

(58) Field of Classification Search
USPC ................. 280/467, 479.2, 479.3, 489, 478.1
See application file for complete search history.

(56) References Cited

U.S. PATENT DOCUMENTS

| | | | | |
|---|---|---|---|---|
| 4,073,508 A | * | 2/1978 | George et al. | 280/478.1 |
| 4,116,458 A | | 9/1978 | Berg | |
| 5,322,315 A | * | 6/1994 | Carsten | 280/479.2 |
| 5,342,076 A | * | 8/1994 | Swindall | 280/479.2 |
| 5,547,210 A | * | 8/1996 | Dugger | 280/477 |
| 5,806,872 A | * | 9/1998 | Szczypski | 280/479.2 |

FOREIGN PATENT DOCUMENTS

| | | |
|---|---|---|
| EP | 1116431 A1 | 7/2001 |
| WO | 2013085545 A2 | 6/2013 |

OTHER PUBLICATIONS

European Search Report issued in counterpart application No. 14177060.2, dated Dec. 11, 2014 (5 pages).

* cited by examiner

*Primary Examiner* — Tony Winner (57) ABSTRACT

A drawbar support assembly includes a rail member attached to a hitch frame, a slider member and a drawbar support. The slider member is slidable in the rail member. The drawbar support has rollers which rollingly engage the slider member so that the drawbar is swingable laterally. The rail member includes a forwardly facing curved slot which slidably receives the tabs which project from the slider member. A spring unit is coupled between the rail member and the slider member and operates to urge the slider member to a central position relative to the rail member.

18 Claims, 13 Drawing Sheets

WIDE SWING DRAWBAR SUPPORT ASSEMBLY

FIELD OF THE INVENTION

The present disclosure relates to a wide swing drawbar support assembly.

BACKGROUND OF THE INVENTION

Various wide swing drawbar support assemblies are available to mount at the rear of an agricultural tractor. However, such drawbar support assemblies interfere with the use of a conventional three point hitch, because the drawbar support components and the hitch components interfere with each other. It is desired to provide a wide swing drawbar support assembly which does not interfere with the use of a conventional three point hitch.

SUMMARY

According to an aspect of the present disclosure, a wide swing drawbar support assembly includes a rail member attached to a hitch frame, a slider member and a drawbar support. The slider member is slidable in the rail member. The drawbar support has rollers which rollingly engage the slider member so that the drawbar is swingable laterally. The rail member includes a forwardly facing curved slot which slidably receives the tabs which project from the slider member. A spring unit is coupled between the rail member and the slider member and operates to urge the slider member to a central position relative to the rail member. The spring unit is mounted in the slot. The spring unit includes a pair of springs attached to opposite ends of a spring holder. The slider member includes a pair of tabs, each tab being engagable with a corresponding one of the springs.

The rail member includes a top plate, a front plate, a rear plate, a front bottom plate which projects rearwardly from a bottom edge of the front plate, and a rear bottom plate projects forwardly from a bottom edge of the rear plate. The slider member is slidably supported by the front and rear bottom plates of the rail member. A pair of end plates and are fixed to opposite ends of slider member to confine a portion of the drawbar support to an interior of the slider member.

DETAILED DESCRIPTION OF THE DRAWINGS

Figure 1:
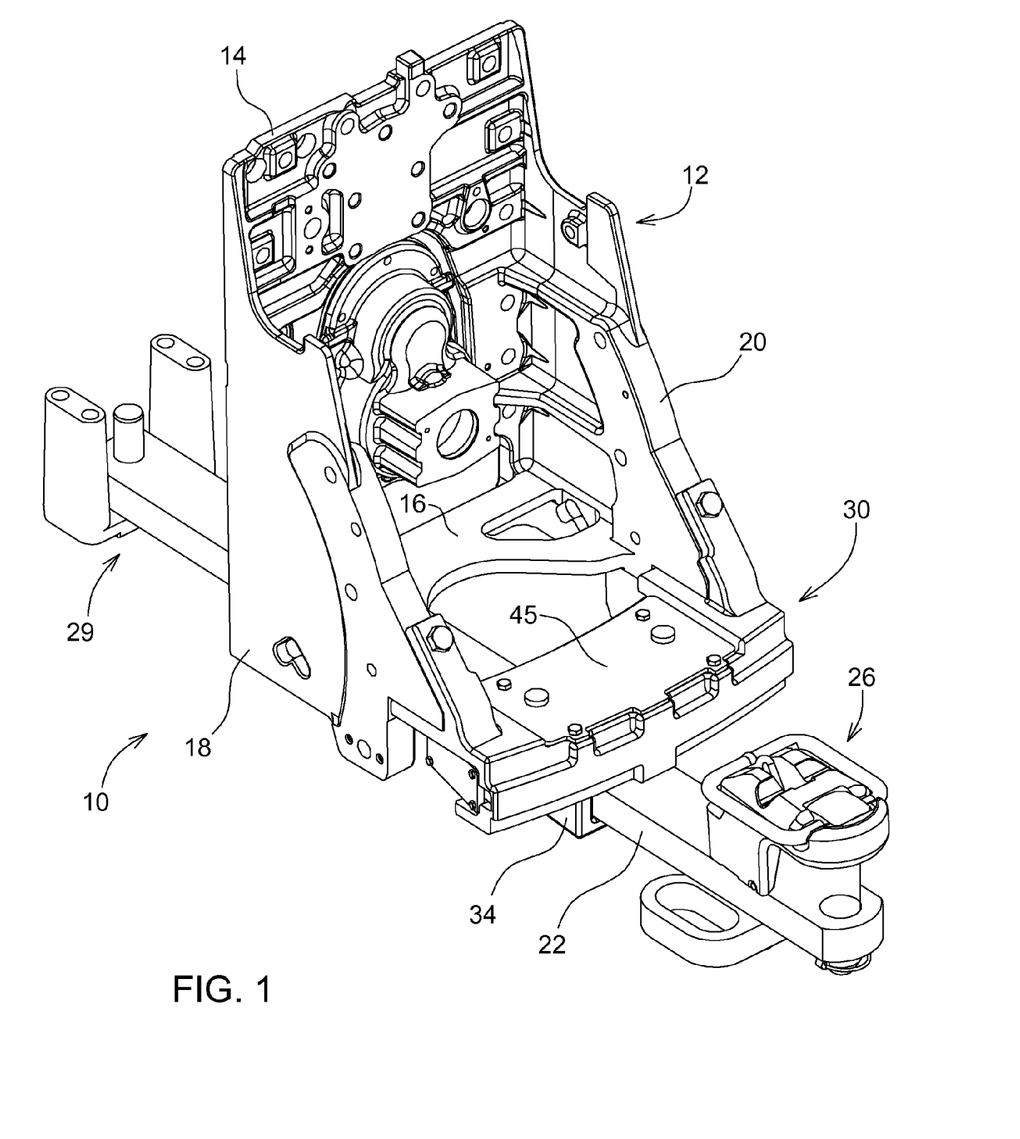
FIG. 1 is a rear side perspective view of a drawbar support assembly embodying the invention.
Figure 2:
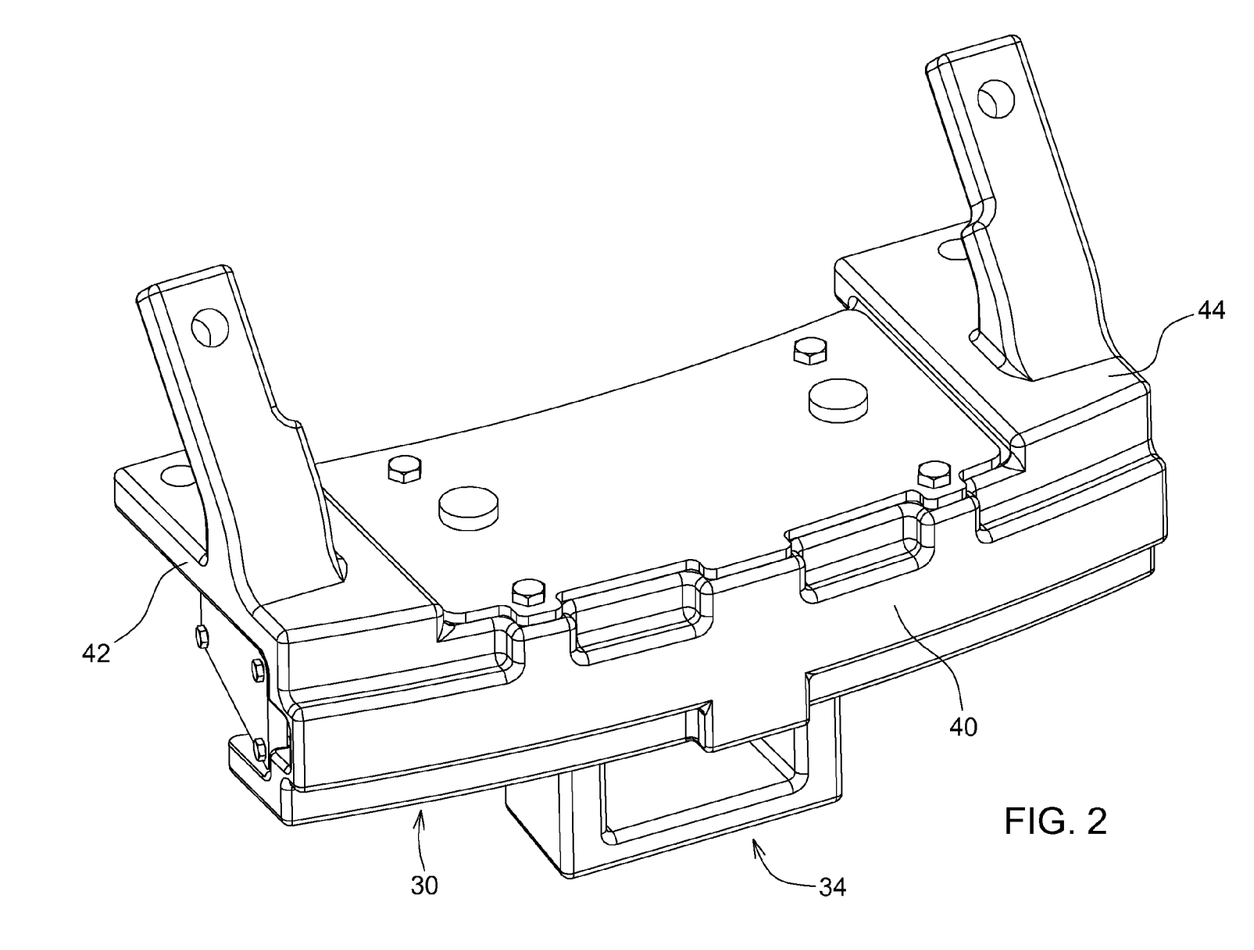
FIG. 2 is top perspective view of a portion of FIG. 1.
Figure 3:
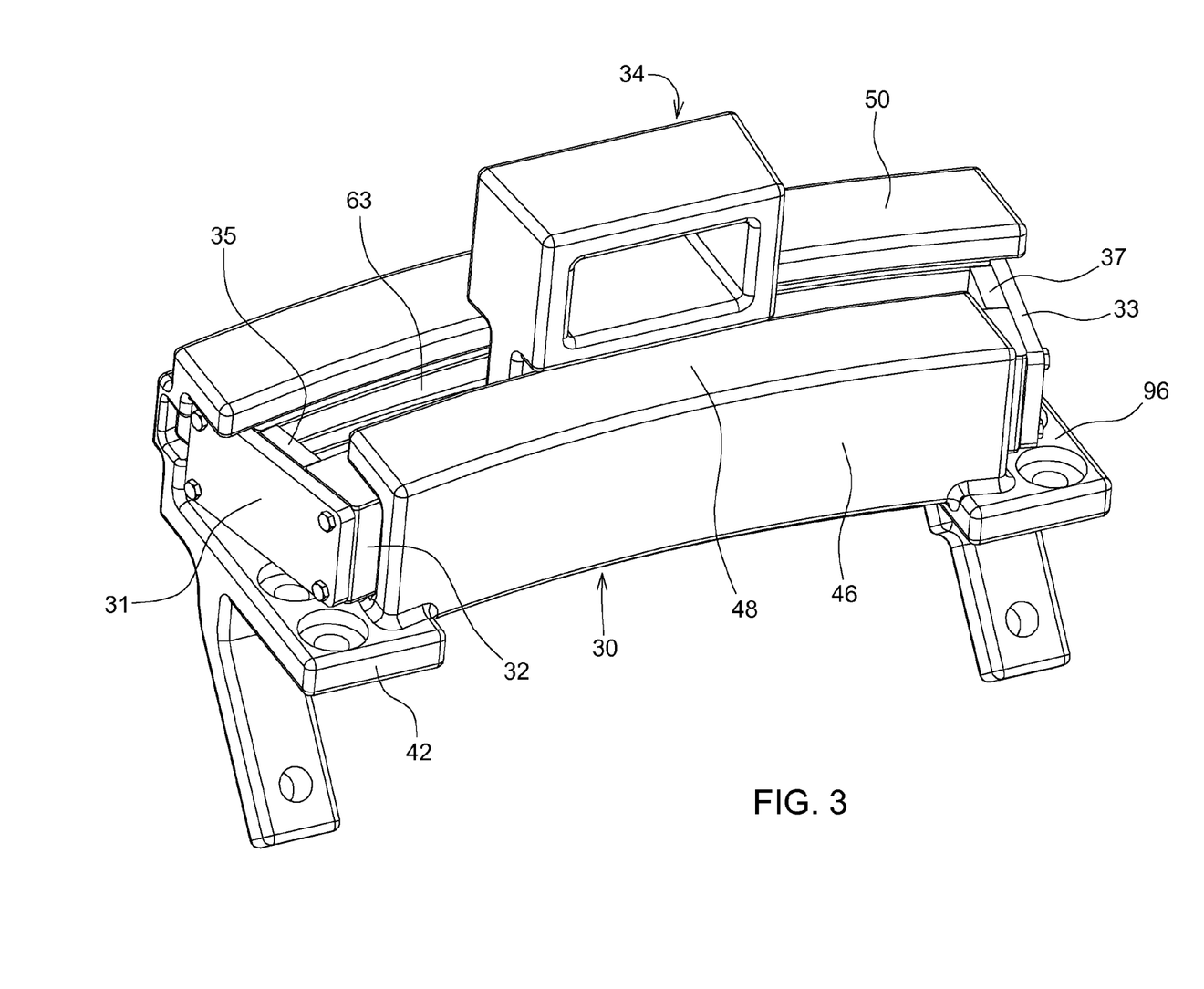
FIG. 3 is a bottom perspective view of a portion of FIG. 1.

Referring to FIGS. 1, 2 and 3, a hitch assembly 10 includes a hitch frame 12 adapted to be mounted to a vehicle (not shown). The hitch frame 12 includes a front plate 14 a bottom plate 16, a left side plate 18 and a right side plate 20. A drawbar 22 has a first end 24 adapted to be pivotally coupled to the vehicle (not shown) and a second end 26 adapted to be coupled to an implement (not shown). A wide swing drawbar support assembly 28 is mounted to the hitch frame 12.

The drawbar support assembly 28 includes a rail member 30, a slider member 32 and a drawbar support 34. The rail member 30 is attached to the rear ends of the side plates 18 and 20 of the hitch frame 12. The slider member 32 is slidably coupled to or received by the rail member 30. The drawbar support 34 engages and supports a part of the drawbar 22. The drawbar support 34 is movably coupled or supported by the slider member 32. As a result, the drawbar 22 is swingable laterally.

Figure 7:
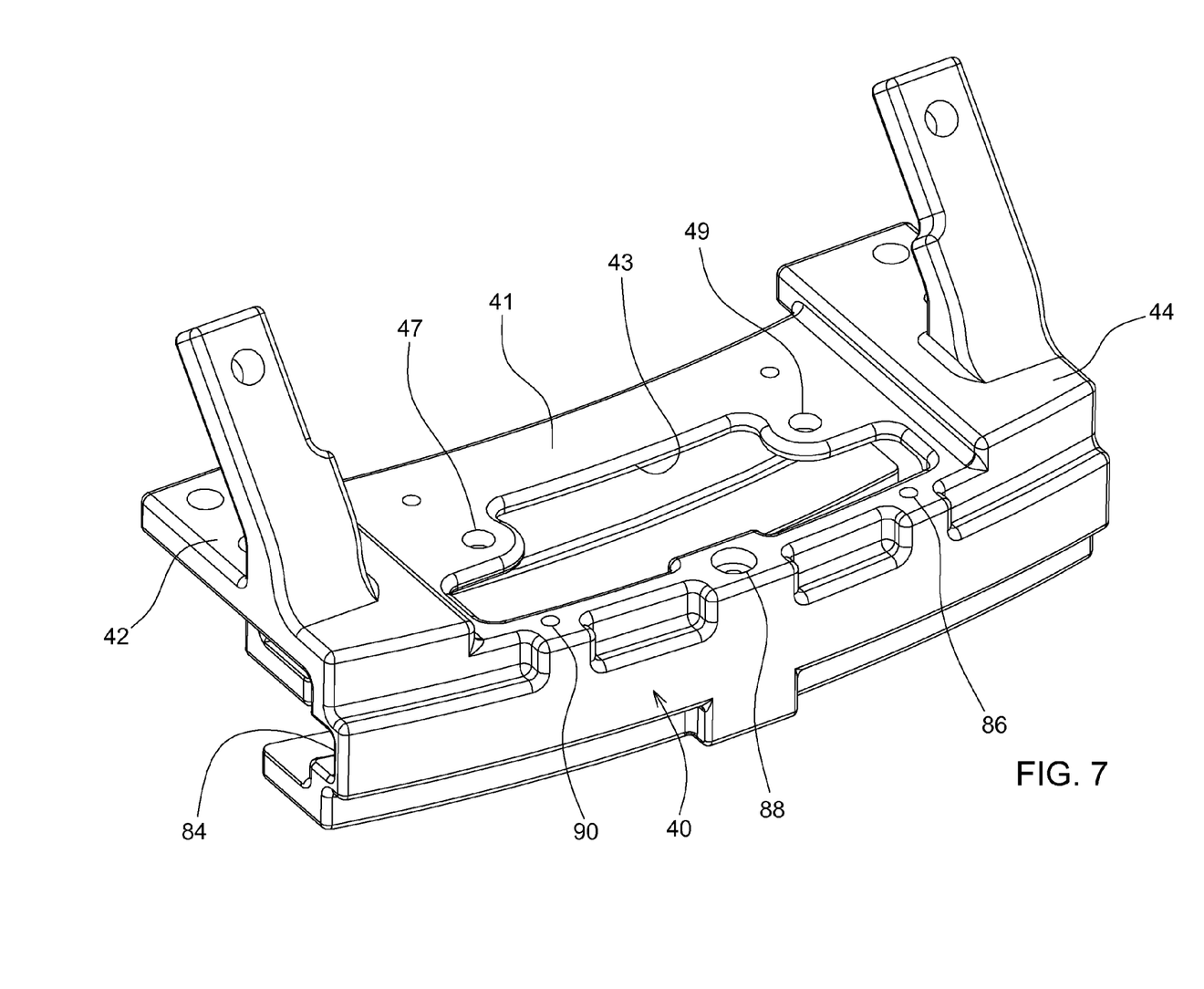
FIG. 7 is a top rear perspective view of the rail member.

Referring now to FIGS. 2, 3 and 7, the rail member 30 has a rear plate 40 and a central top plate 41 which is connected to a pair of top end plates 42 and 44 which extend forwardly from the respective left and right ends of the rear plate 40. An opening 43 is formed in plate 41. The opening 43 is covered by a top cover 45. Pin bores 47 and 49 extend through the central top plate 41 and are aligned with similar pin bores in the top cover 45.

As best seen in FIG. 3, the rail member 30 also includes a front plate 46 and a front bottom plate 48 which projects rearwardly from the bottom edge of the front plate 46. A rear bottom plate 50 projects forwardly from the bottom edge of the rear plate 40. All these members of the rail member 30 are curved with a center of curvature centered at the pivot point of the drawbar 22. End plates 31 and 33 are fixed to the ends of slider member 32 to confine the drawbar support 34 to the interior of the slider member 32. Rubber pads 35 and 37 may be mounted to the inner sides of the end plates 31 and 33, respectively, to absorb impacts from the drawbar support 34.

Figure 4:
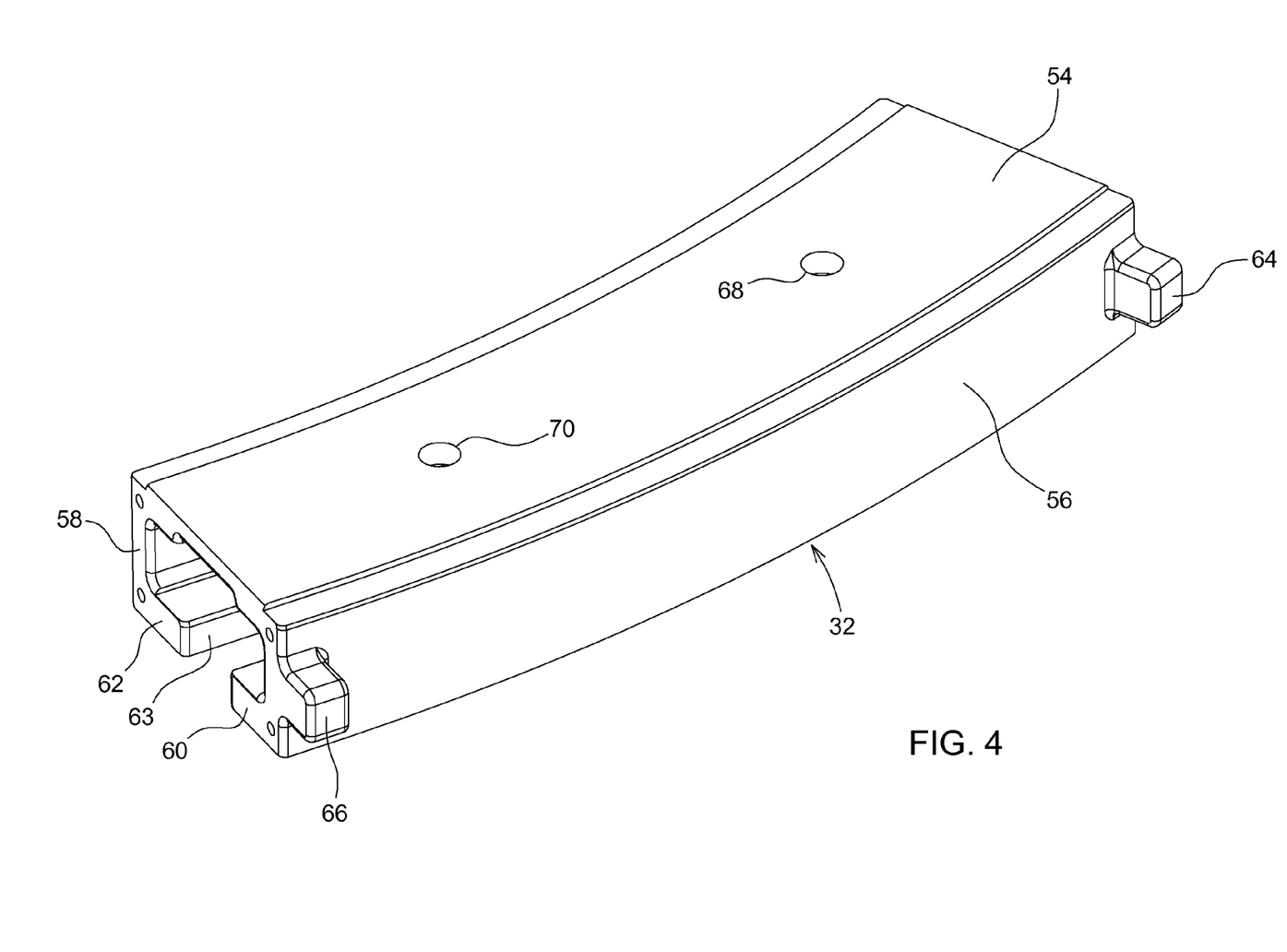
FIG. 4 is a top rear perspective view of the slider member.

Referring now to FIG. 4, the slider member 32 includes a curved top plate 54 which is joined to a curved rear plate 56 and a curved front plate 58. A rear bottom plate 60 projects forwardly from the bottom edge of the rear plate 56, and a front bottom plate 62 projects rearwardly from the bottom edge of the front plate 58. The curved plates 60 and 62 are separated by a curved gap 63. Stop tabs 64 and 66 project rearwardly from the side ends of the rear plate 56. Spaced-apart bores 68 and 70 extend vertically through the top plate 54. The slider member 32 is slidably supported by the front and rear bottom plates 48, 50 of the rail member 30.

Figure 5:
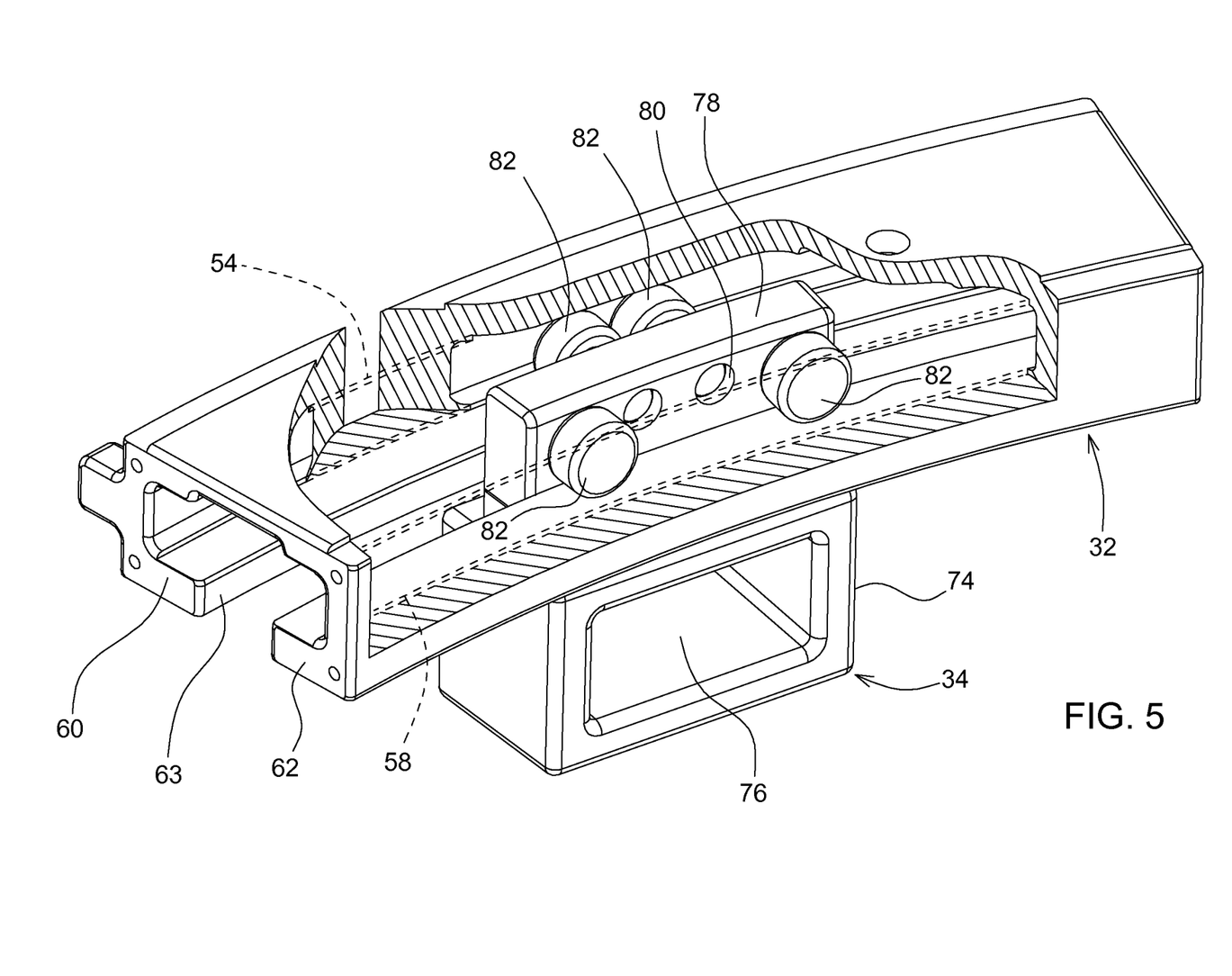
FIG. 5 is a top front perspective view of the slider member with the drawbar support.

Referring now to FIG. 5, drawbar support 34 includes a drawbar receiving part 74 which has a rectangular opening 76 for receiving the drawbar 22. Part 74 depends from plate 78 which has a plurality or bores 80 for receiving cam rollers 82. Cam rollers 82 rollingly engage the plates 60 and 62. Plate 78 extends through and is received by the gap 63 in the slider member 32.

Figure 6:
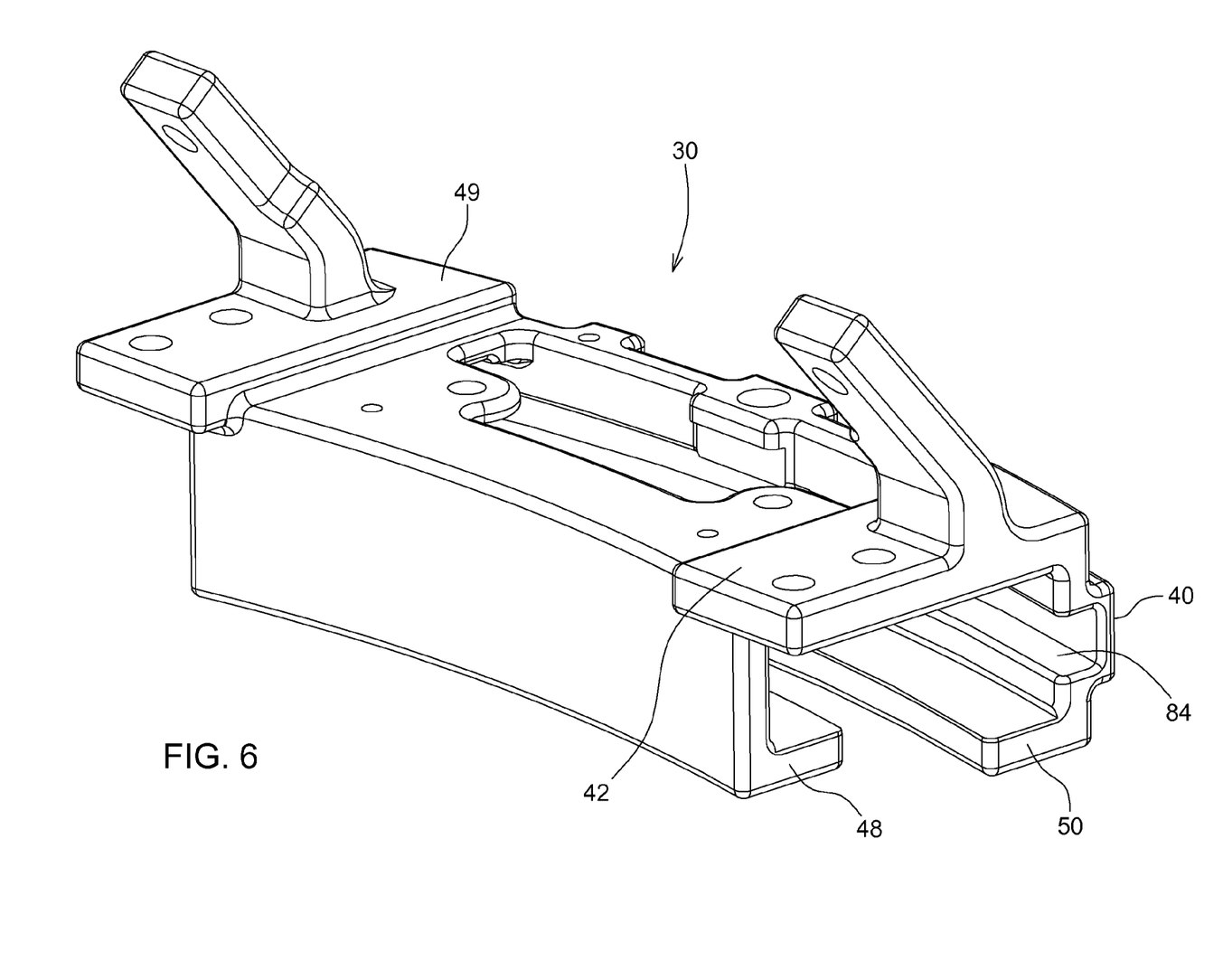
FIG. 6 is a top front perspective view of the rail member.

Referring now to FIGS. 6 and 7, the rail member 30 includes a forwardly facing curved slot 84 which is formed in the rear plate 40. Slot 84 slidably receives the tabs 64 and 66. Pin bores 86, 88 and 90 are spaced apart and extend into the rear plate 40 and intersect with the slot 84.

Figure 8:
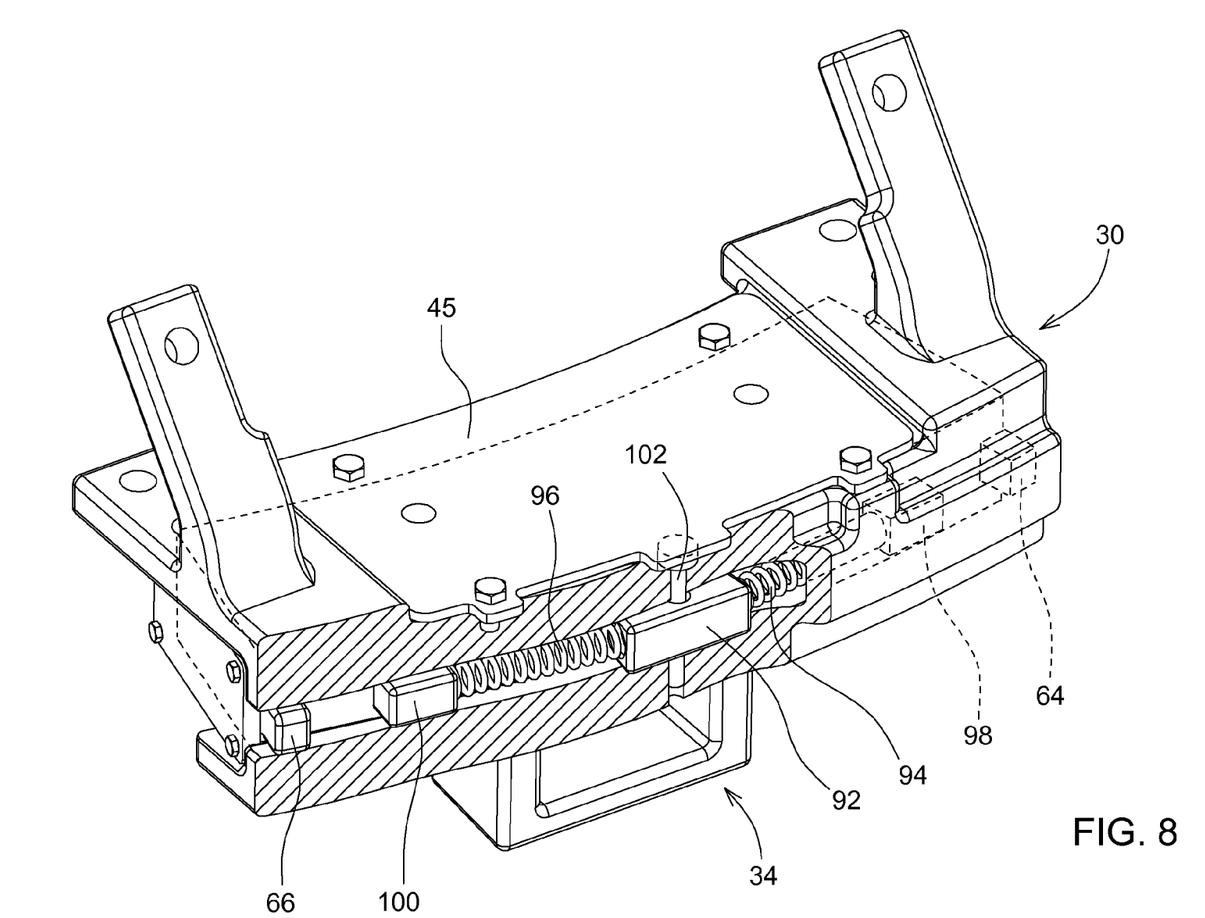
FIG. 8 is a partially sectioned top rear perspective view of the rail member assembled to other parts.

As best seen in FIG. 8, the slot 84 also receives a spring holder 92 which receives and hold the ends of a pair of springs 94 and 96. Spring end blocks 98 and 100 are fixed to the ends of spring 94 and 96, respectively. Spring holder 92 is held in place by pin 102 which can be inserted through bore 88 and holder 92. Thus, as slider 30 is slid to the left (viewing FIG. 8), tab 64 will engage end block 98 and compress spring 94. Similarly, as slider 30 is slid to the right (viewing FIG. 8), tab 66 will engage end block 100 and compress spring 96. The springs 94 and 96 are part of a spring unit which is biased to urge the slider member 32 to a central position relative to the rail member 30.

Figure 9:
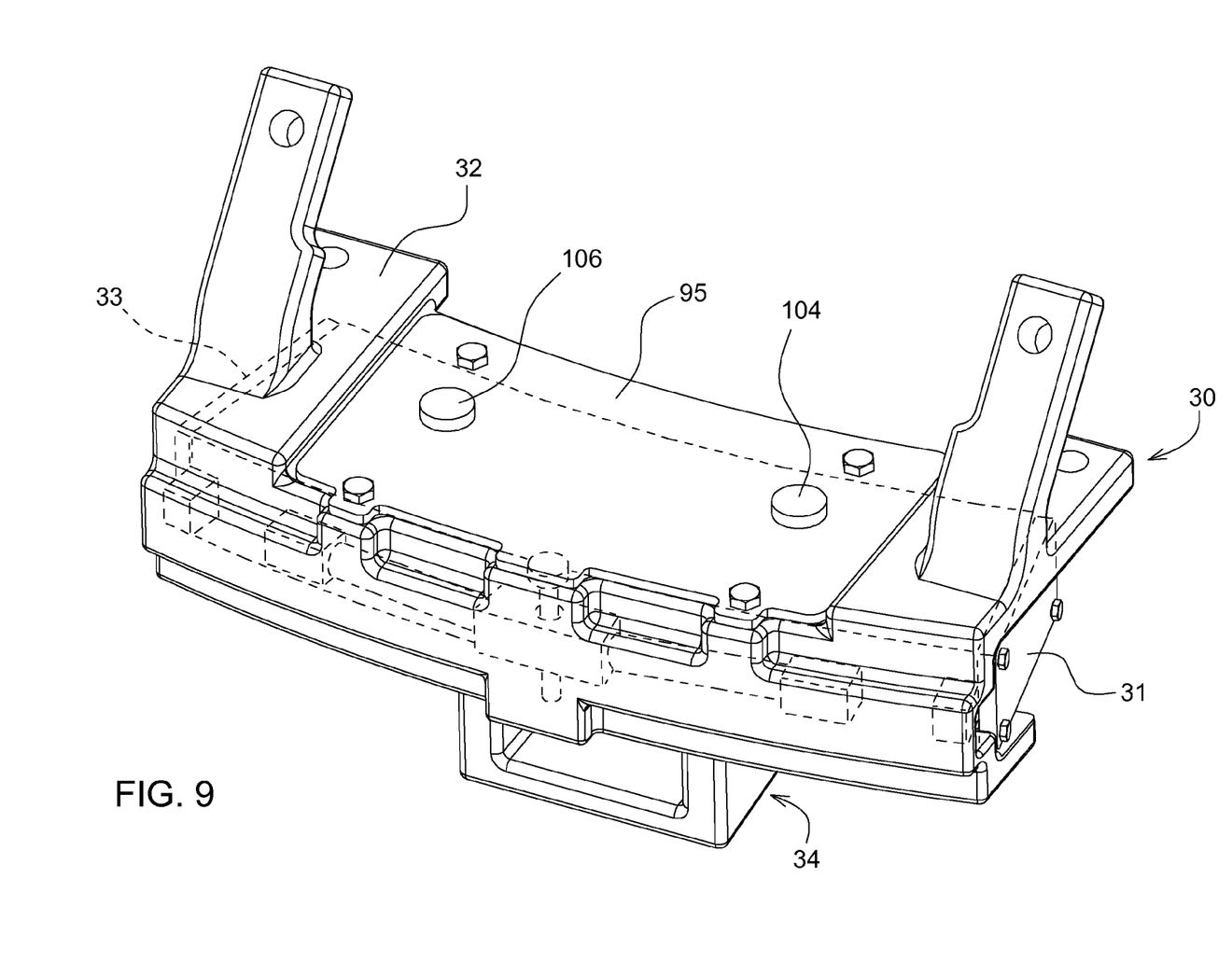
FIG. 9 is a top rear perspective assembly view of the drawbar support assembly with parts shown in phantom for clarity.
Figure 10:
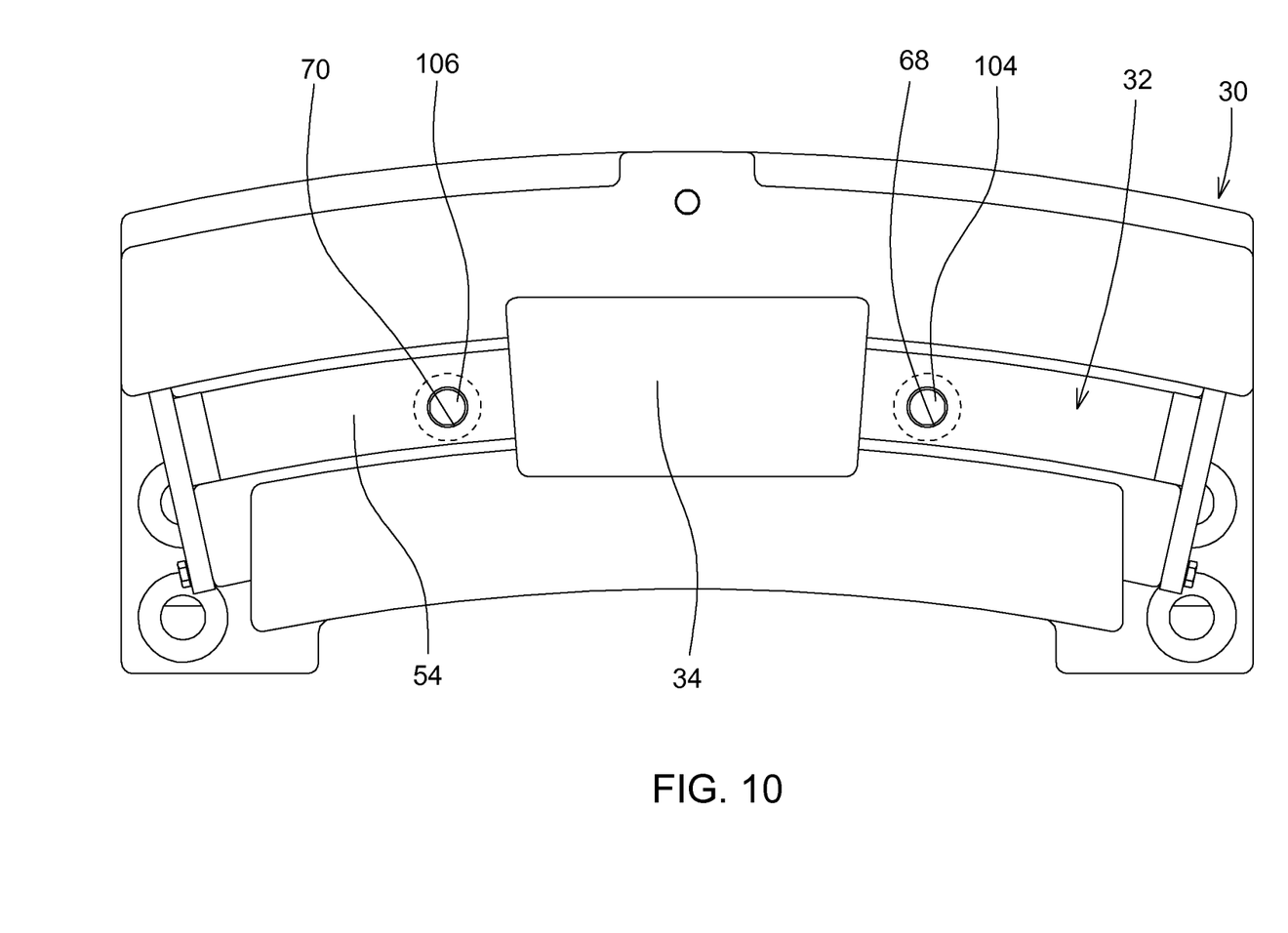
FIG. 10 is a bottom view of the drawbar support assembly of FIG. 9.

Referring now to FIGS. 4, 9 and 10, locking pins 104 and 106 are removably inserted through top cover 45 and into the pin bores 68 and 70 in the top plate 54 of the slider 32. This prevents slider 32 from moving laterally with respect to the rail member 30. The pins 104, 106 extend though bores 68 and 70 in the top plate 54 and are engagable with the drawbar support 34 to limit the swing of the drawbar support 34 to a certain range, such as 15 degrees of swing.

Figure 11:
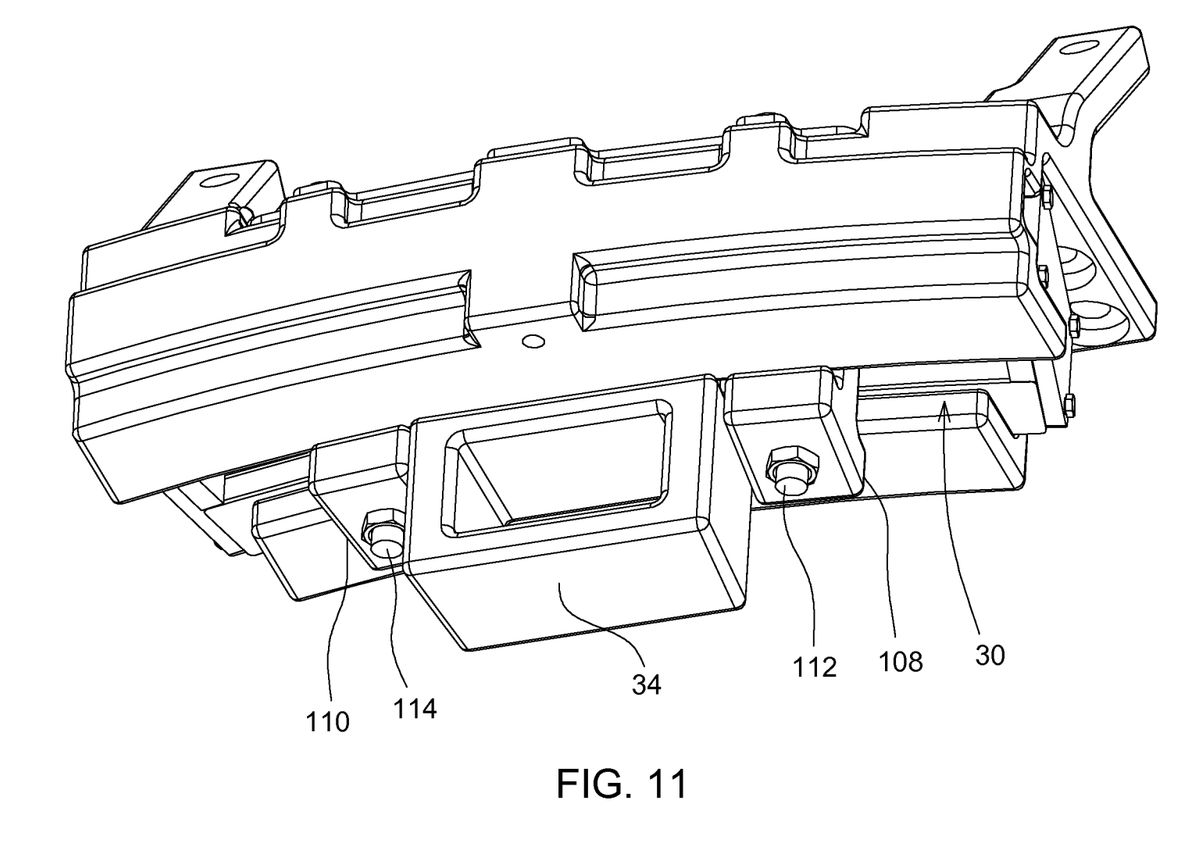
FIG. 11 is a bottom rear perspective view of the drawbar support assembly including a pair of stoppers.
Figure 12:
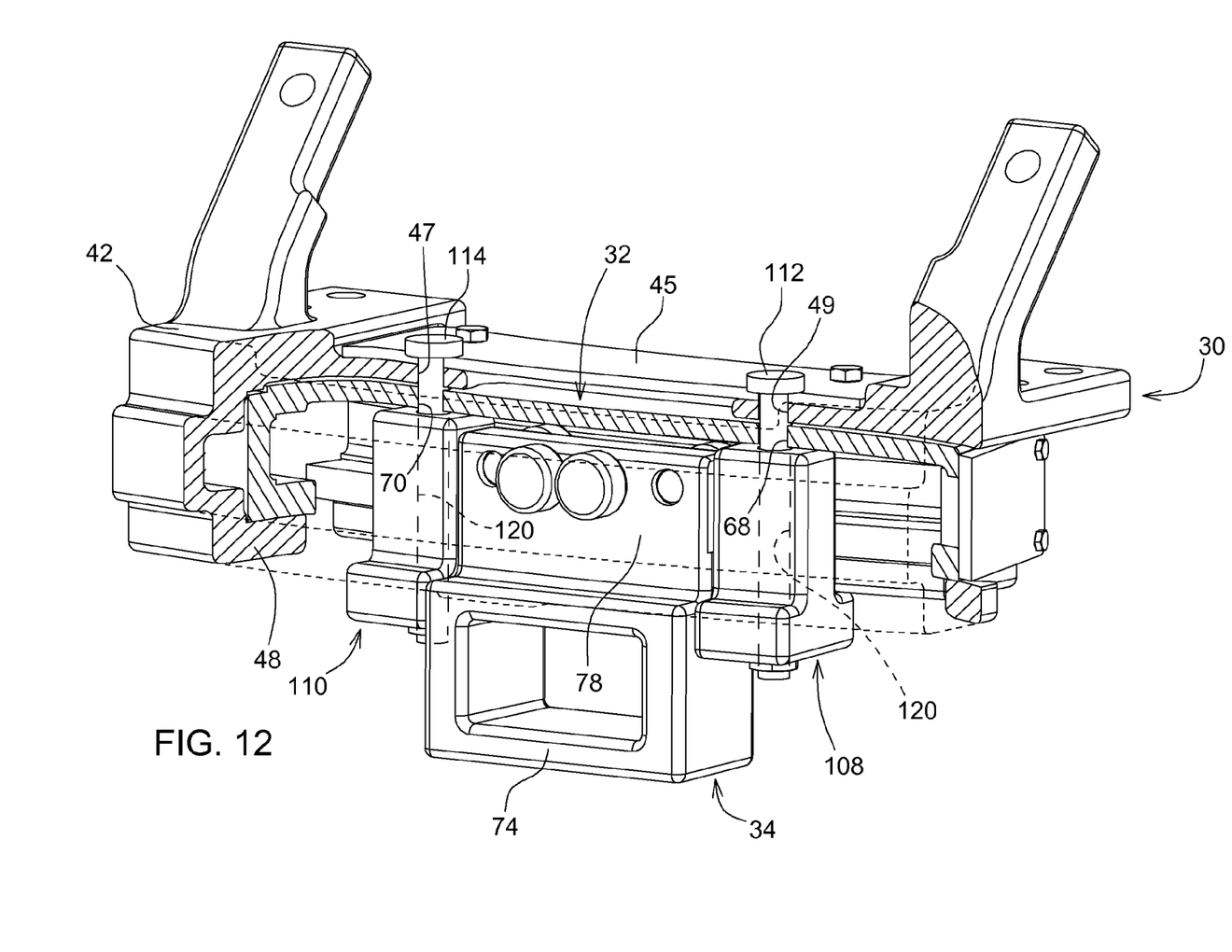
FIG. 12 is partially sectioned rear perspective view of the drawbar support assembly of FIG. 11.
Figure 13:
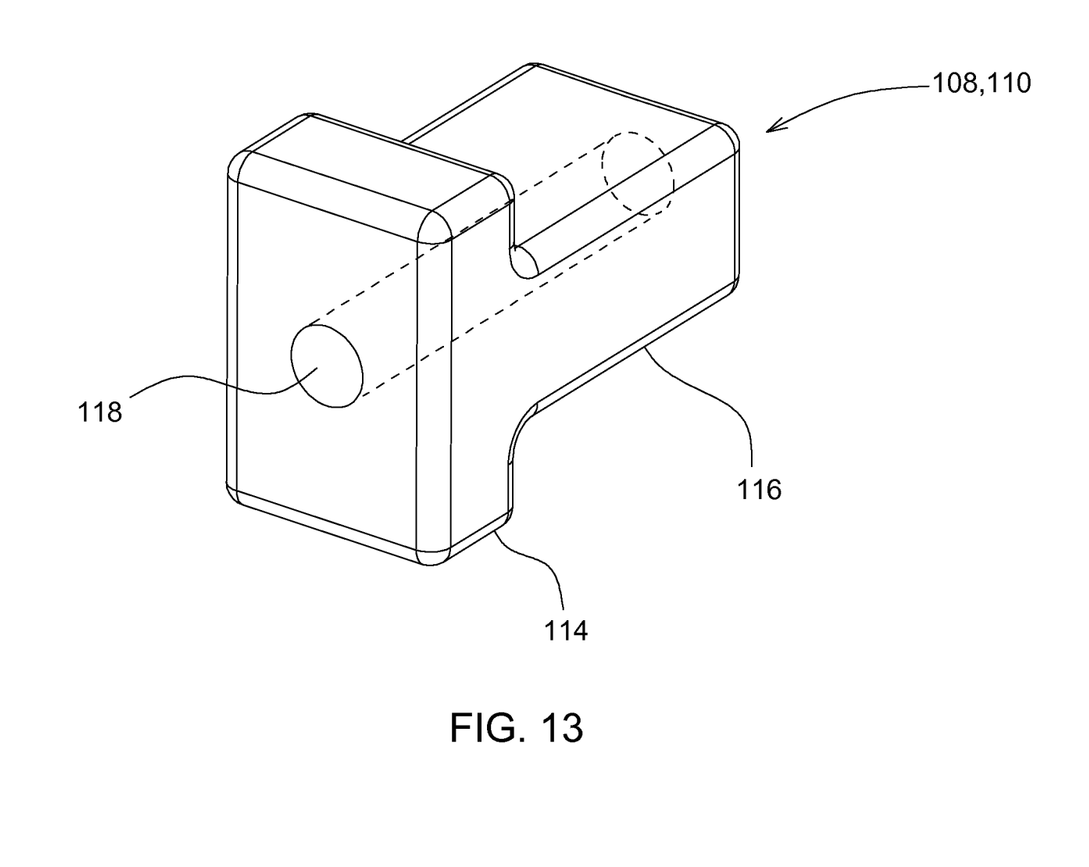
FIG. 13 is a perspective view of a stopper of FIG. 11.

Referring now to FIG. 11-13, stoppers 108 and 110 are removably attached by bolts 112 and 114 to lock out and prevent drawbar support 34 from moving laterally with respect to the rail member 30. As best seen in FIG. 12, each stopper 108, 110 includes a larger rectangular head portion 116 and a smaller shank portion 118. A bore 120 extends through both the head and shank portions to receive the bolts 112 and 114. Bolts 112 and 114 extend through bores 49, 47 in rail member 30, through bores 68, 70 in slider 32 and through bores 120 in stoppers 108, 110. All lateral swing of the drawbar support 34 will be prevented when bolts 112 and 114 and stoppers 108 and 110 are installed.

The result is a wide swing drawbar support assembly which can be mounted on a tractor which has a 3-point hitch, so that both a wide swing drawbar and the 3-point hitch can be used.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A drawbar support assembly comprising:
   a rail member adapted to be mounted to a vehicle;
   a slider member slidably received by the rail member, the slider member forming a pair of spaced apart curved plates; and
   a drawbar support member movably coupled to the slider member, the drawbar support member having a drawbar receiving part adapted to receive and support the drawbar, the drawbar support member including rollers which rollingly engage the curved plates.

2. The drawbar support assembly of claim 1, wherein:
   the pair of curved plates are separated by a curved gap; and
   a portion of the drawbar support extends through said gap.

3. The drawbar support assembly of claim 1, wherein:
   the slider member forms a curved gap; and
   a portion of the drawbar support is slidably received by the gap.

4. A drawbar support assembly comprising:
   a curved laterally extending rail member adapted to be mounted to a vehicle;
   a slider member slidably engaging the rail member, the slider member being movable laterally along a curve defined by the rail member; and
   a drawbar support member movably coupled to the slider member, the drawbar support having a drawbar receiving part adapted to receive and support the drawbar, rail and slider member cooperating so that the drawbar is swingable laterally.

5. The drawbar support assembly of claim 4, wherein:
   the rail member forms a curved slot;
   a spring holder is mounted in the slot;
   a pairs of springs are attached to opposite sides of the spring holder; and
   the slider member includes a pair of tabs, each tab being engagable with a corresponding one of the springs, said springs being biased to urge the slider member to a central position relative to the rail member.

6. The drawbar support assembly of claim 4, further comprising:
   a pair of pin bores formed in the rail member; and
   a pair of pins, each pin being insertable through one of the pin bores to engage the slider member and thereby limit motion of the slider member with respect to the rail member.

7. The drawbar support assembly of claim 4, further comprising:
   a pair of pin bores formed in the rail member;
   a pair of stoppers; and
   a pair of pins, each pin being insertable through one of the pin bores, through the slider member and through one of the stoppers, the stoppers engaging and preventing motion of the drawbar support member relative to the rail member.

8. The drawbar support assembly of claim 4, wherein:
   the drawbar is pivotal with respect to the vehicle about a pivot axis; and
   the rail member and the slider member are curved with a center of curvature at said pivot axis.

9. The drawbar support assembly of claim 4, wherein the rail member comprises:
   a front plate;
   a rear plate;
   a front bottom plate which projects rearwardly from a bottom edge of the front plate; and
   a rear bottom plate projects forwardly from a bottom edge of the rear plate.

10. The drawbar support assembly of claim 9, wherein:
    a forwardly opening curved slot is formed in the rear plate;
    a spring holder is mounted in the slot;
    a pairs of springs are attached to opposite sides of the spring holder; and
    the slider member includes a pair of tabs, each tab being engagable with a corresponding one of the springs, said springs being biased to urge the slider member to a central position relative to the rail member.

11. The drawbar support assembly of claim 4, wherein:
    a pair of end plates and are fixed to opposite ends of slider member to confine the drawbar support to an interior of the slider member.

12. The drawbar support assembly of claim 11, further comprising:
    a pair of resilient pads, each pad being mounted to a corresponding one of the end plates, the pads absorbing impacts from the drawbar support.

13. A drawbar support assembly comprising:
    a rail member adapted to be mounted to a vehicle;
    a slider member slidably received by the rail member; and a drawbar support member movably coupled to the slider member, the drawbar support having a drawbar receiving part adapted to receive and support the drawbar;
a spring holder mounted in the rail member; and
a pairs of springs attached to opposite sides of the spring holder, the slider member being engagable with the springs, said springs being biased to urge the slider member to a central position relative to the rail member.

14. The drawbar support assembly of claim 13, wherein:
the slider member includes a pair of tabs, each tab being engagable with a corresponding one of the springs.

15. The drawbar support assembly of claim 13, wherein:
the slider member forms a pair of spaced apart curved plates; and
the drawbar support includes rollers which rollingly engage the curved plates.

16. The drawbar support assembly of claim 15, wherein:
the pair of curved plates are separated by a curved gap; and
a portion of the drawbar support extends through said gap.

17. The drawbar support assembly of claim 13, wherein:
the slider member forms a curved gap; and
a portion of the drawbar support is slidably received by the gap.

18. The drawbar support assembly of claim 13, further comprising:
a pair of pin bores formed in the rail member;
a pair of stoppers; and
a pair of pins, each pin being insertable through one of the pin bores, through the slider member and through one of the stoppers, the stoppers engaging and preventing motion of the drawbar support member relative to the rail member.

* * * * *